United States Patent [19]

Hotier et al.

[11] Patent Number: 5,582,736
[45] Date of Patent: Dec. 10, 1996

[54] CHROMATOGRAPHIC SIMULATED MOBILE BED SEPARATION PROCESS WITH DEAD VOLUME CORRECTION USING AN INCREASE IN FLOW RATE

[75] Inventors: Gérard Hotier, Rueil Malmaison; Choua Cohen; Nicolas Couenne, both of Lyons; Jean-Michel Toussaint, Asnieres, all of France

[73] Assignee: Institut Francais Du Petrole, Rueil Malmaison, France

[21] Appl. No.: 494,562

[22] Filed: Jun. 22, 1995

[30] Foreign Application Priority Data

Jun. 22, 1994 [FR] France ................................. 94 07762

[51] Int. Cl.$^6$ ................................................. B01D 15/08
[52] U.S. Cl. ................................. 210/659; 210/198.2
[58] Field of Search ........................ 210/635, 656, 210/659, 662, 198.2; 127/46.1, 46.2

[56] References Cited

U.S. PATENT DOCUMENTS

| | | | |
|---|---|---|---|
| 4,402,832 | 9/1983 | Gerhold | 210/659 |
| 4,498,991 | 2/1985 | Oroskar | 210/659 |
| 4,724,081 | 2/1988 | Kawahara | 210/198.2 |
| 4,970,002 | 11/1990 | Ando | 210/659 |
| 4,990,259 | 2/1991 | Kearey | 210/659 |
| 5,064,539 | 11/1991 | Tanimura | 210/659 |
| 5,093,004 | 3/1992 | Hotier | 210/659 |
| 5,114,590 | 5/1992 | Hotier | 210/659 |
| 5,422,007 | 6/1995 | Nicound | 210/659 |
| 5,470,464 | 11/1995 | Priegnitz | 210/659 |

FOREIGN PATENT DOCUMENTS

| | | | |
|---|---|---|---|
| 0415821 | 6/1991 | European Pat. Off. | 210/198.2 |
| 2690630 | 11/1993 | France | 210/198.2 |
| 91/08815 | 6/1991 | WIPO | 210/198.2 |

*Primary Examiner*—Ernest G. Therkorn
*Attorney, Agent, or Firm*—Millen, White, Zelano & Branigan, P.C.

[57] ABSTRACT

In a simulated mobile bed separation process, perturbations are corrected in the compositions of an extract (EA) or raffinate (RB) due to the dead volume introduced by at least one recycling pump (P) or compressor for a liquid, supercritical or gaseous mixture in a closed circuit of columns. The process is characterized in that each time an extract extraction stream (EA) or that of the raffinate (RB) passes from a position immediately anterior to a position immediately posterior to each of the dead volumes in the circuit, the flow rate of the flow rate regulated recycling pump or compressor is increased for the time which the extract or raffinate remains in the position immediately posterior to the dead volume When the extract or raffinate extraction stream passes from the immediately posterior position to the dead volume to the following position, the flow rate of the recycling pump or compressor is reduced so that the flow rate regains the value which would have been applied if the dead volume had been ignored.

The invention is applicable to the separation of aromatic hydrocarbons containing 8 carbon atoms.

8 Claims, 4 Drawing Sheets

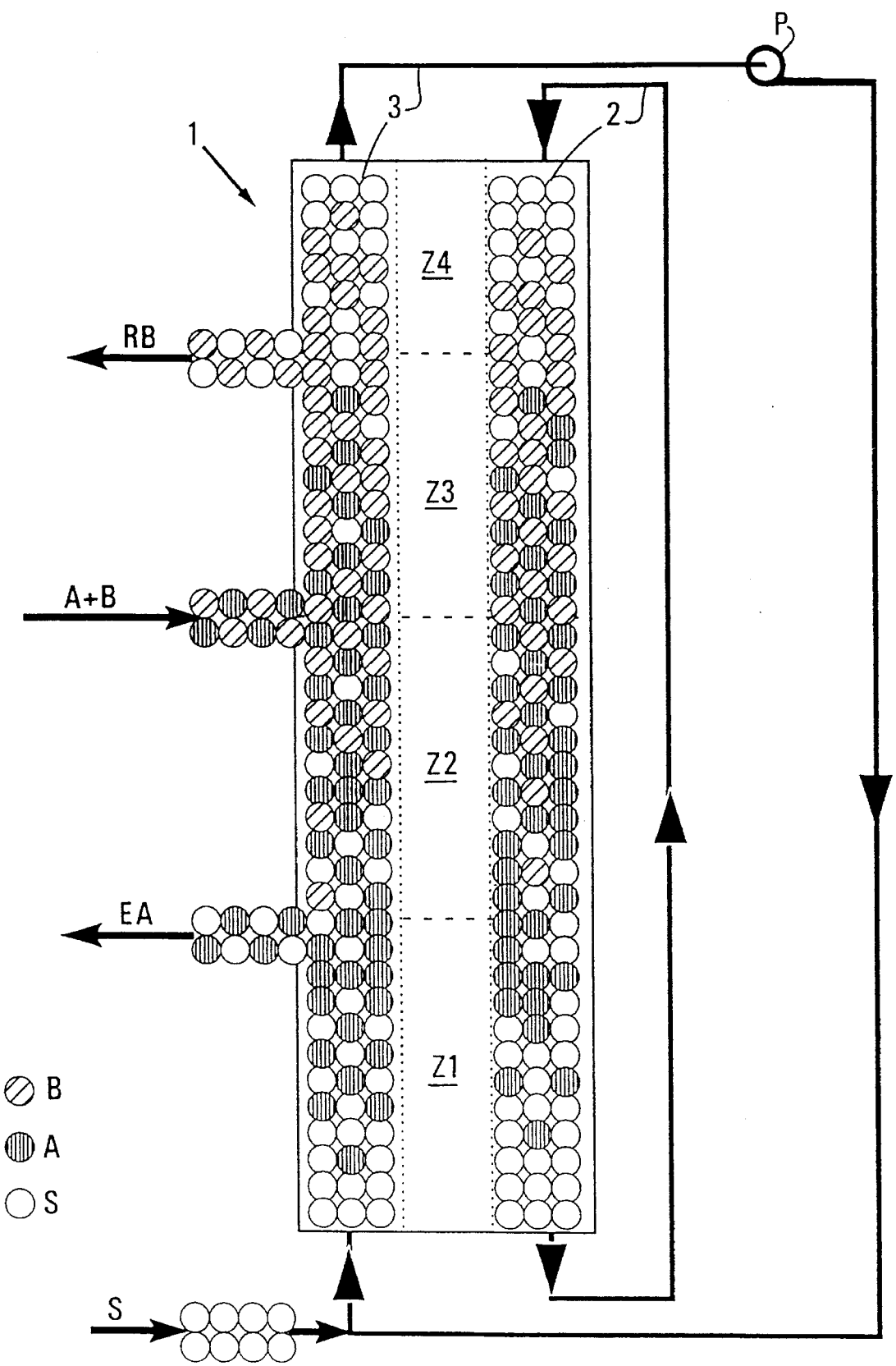

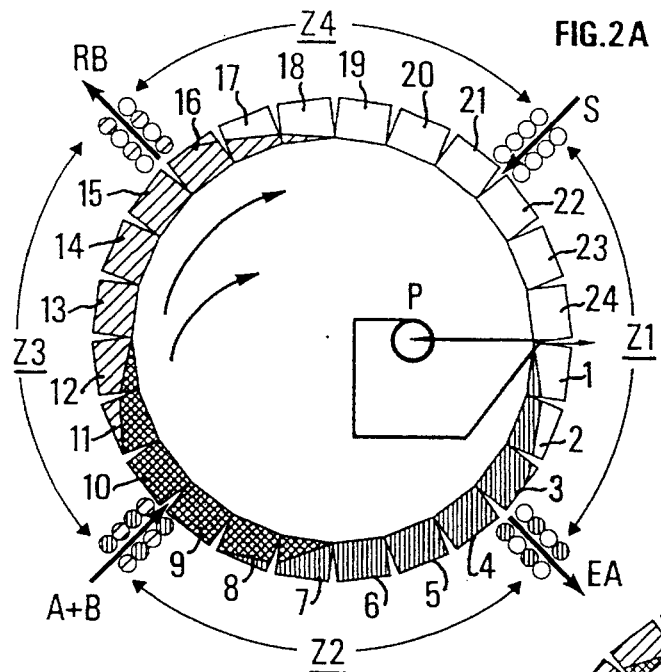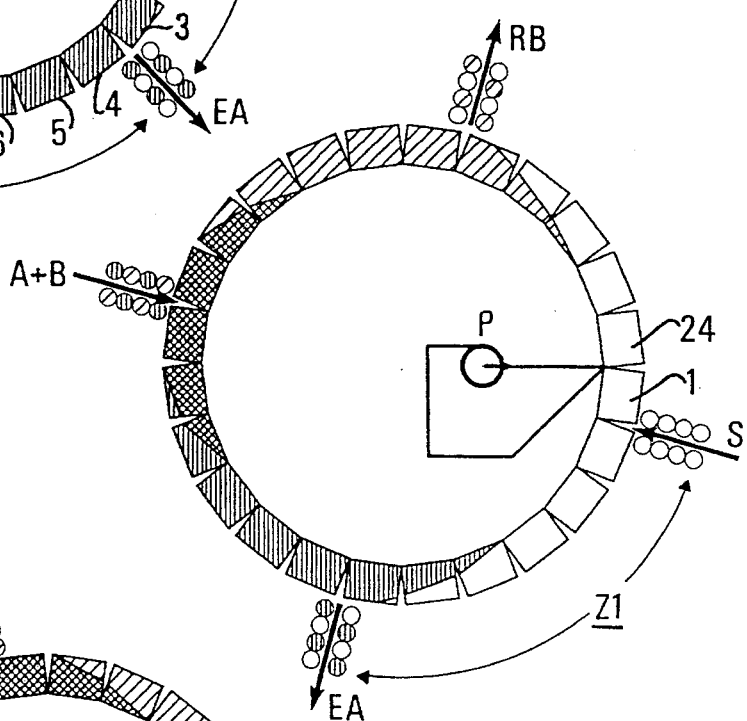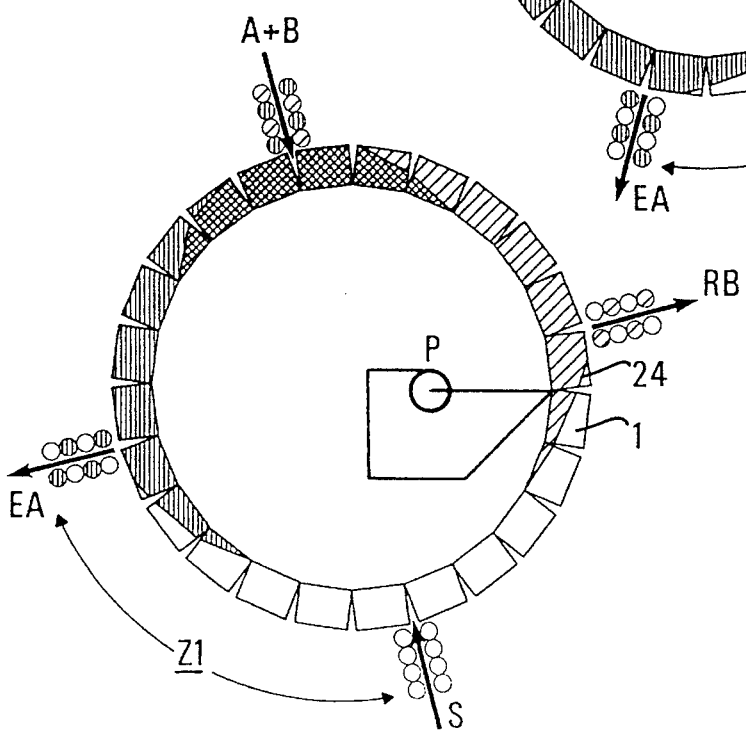

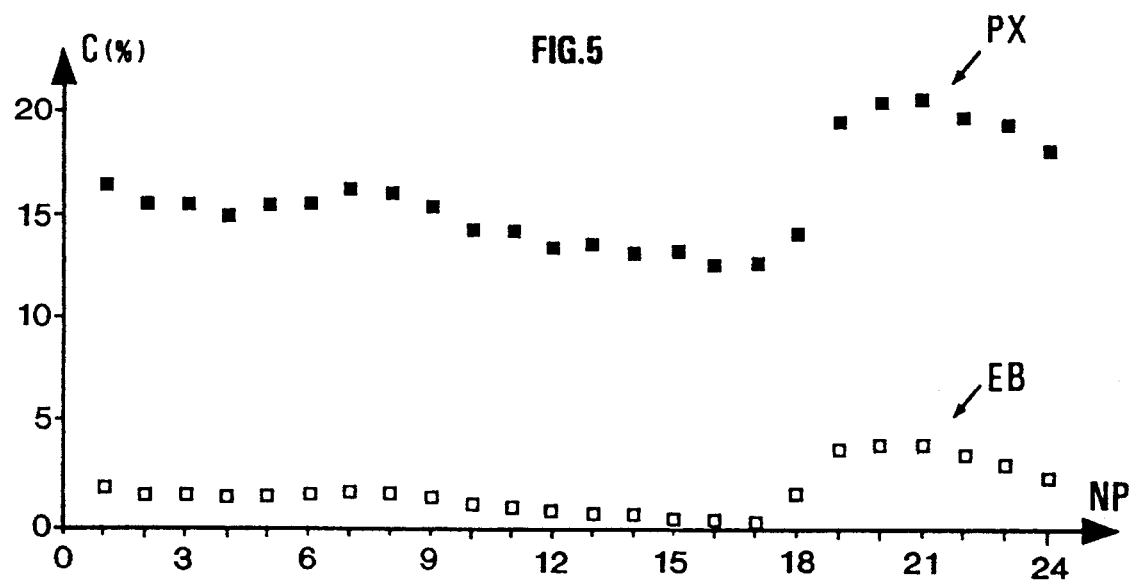
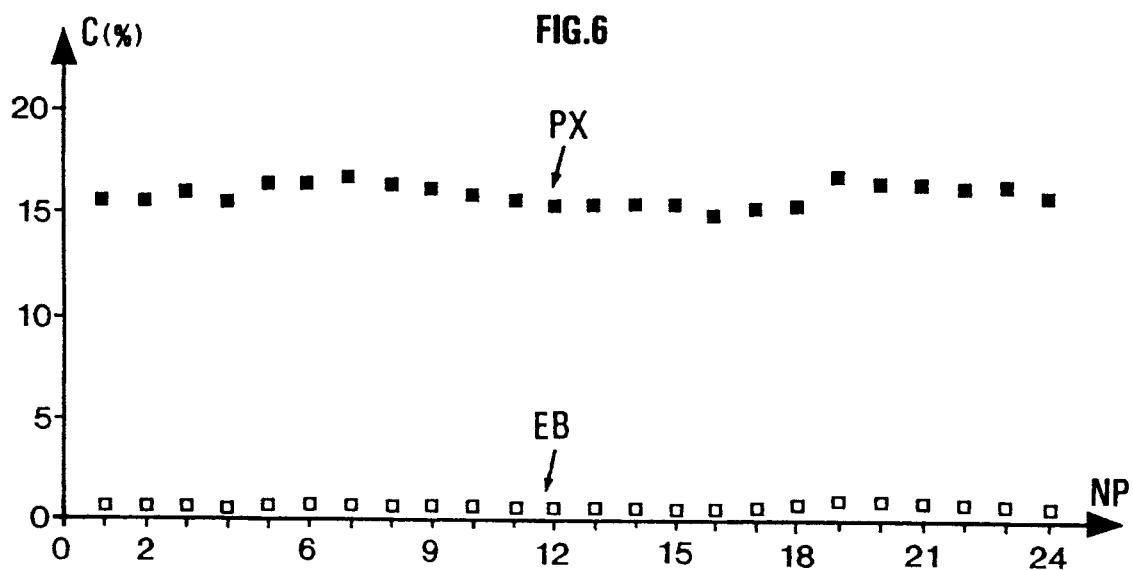

CHROMATOGRAPHIC SIMULATED MOBILE BED SEPARATION PROCESS WITH DEAD VOLUME CORRECTION USING AN INCREASE IN FLOW RATE

The present invention concerns a process for the fractionation of fluid mixtures of components using a chromatographic method.

It is particularly applicable to the separation of aromatic hydrocarbons containing eight carbon atoms.

Chromatography is based on the fact that certain porous solids, in the presence of liquid, gaseous or supercritical mixtures, can retain the different constituents of the mixture to a greater or lesser extent.

Separation processes based on chromatography are usually operated as follows: the porous solid, of known granulometry, is contained in a generally cylindrical receptacle, the column; this constitutes the stationary phase. The mixture to be separated is percolated through the column, and the constituents arrange themselves successively depending on the extent to which they are retained by the stationary phase.

The prior art is illustrated in European patent EP-A-0 415 821, French patent FR-A-2 690 630 and International patent WO-A-9 108 815.

The separation process of this invention is simulated mobile bed chromatographic separation, in counter-current or co-current mode, such as that described in particular in U.S. Pat. Nos. 2,985,589, 4,402,832 and 4,498,991.

BRIEF DESCRIPTION OF THE DRAWINGS

The invention is illustrated in the accompanying figures, in which:

FIG. 1 shows the principle of real counter-current separation;

FIGS. 2A, 2B, 2C show the operation of simulated counter-current separation;

FIG. 5 shows variations in the average composition C (weight %) of the extract for each period in the cycle as a function of the period number NP in the cycle, without compensation for the dead volume; and FIG. 6 shows variations in the average composition C (weight %) of the extract for each period in the cycle as a function of the period number NP in the cycle, with the compensation of the invention applied.

DESCRIPTION OF THE PREFERRED EMBODIMENTS

Figure 3:
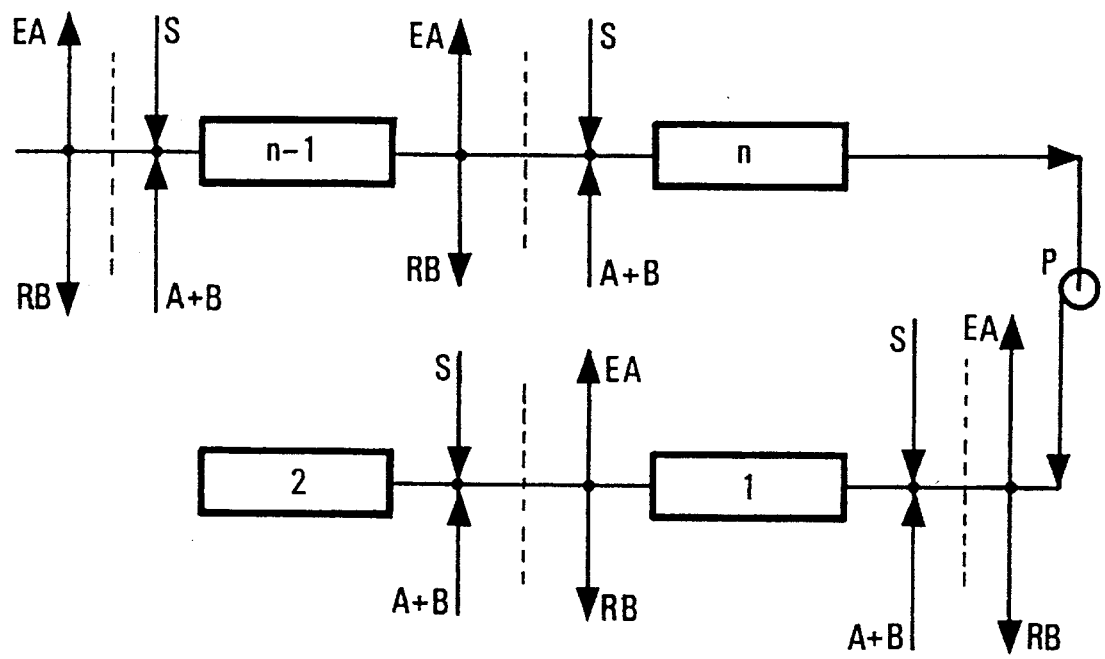
FIG. 3 shows a simulated mobile bed where the recycling pump is fixed to the $n^{th}$ bed or column section.

One way of explaining the operation of a simulated mobile bed chromatographic separation process consists of representing it by an equivalent real counter-current process.

In the real counter-current process represented in FIG. 1 and containing four zones Z1, Z2, Z3 and Z4, a fixed and constant concentration profile develops in separation column 1, where the positions of injection points for a feed A+B and an eluent S, and of extraction points for an extract EA and a raffinate RB remain fixed, while the solid adsorbent 2 and liquid 3 displace counter-current to each other. In this process, recycling pump P returns liquid from a high point to a low point in the column, while a mobile bed system, for example, returns the solid from the low point to the high point. These two systems contain a point where the only species present in the concentration profile in both the liquid and the solid is the eluting eluent. This point is at the junction of zones I and IV (see FIG. 1). In this situation, the volumes of liquid and solid engaged in the recycling systems are of no real interest since only one species is present and backmixing effects are of no consequence.

The success of simulated mobile bed chromatographic separation processes leans on the difficulty of correctly circulating a solid without causing attrition and without considerably increasing the porosity of the bed compared with a fixed bed. In simulated mobile bed processes, the solid is located in a number n of fixed beds, n generally being between four and twenty-four. The major difference between real counter-current processes and simulated mobile bed processes is due to the fact that in the latter, the concentration profile is no longer fixed but displaces at a uniform speed around a closed circuit constituted by n fixed beds or chromatographic columns disposed in a series where the outlet to the $n^{th}$ fixed bed is connected to inlet to the first bed.

Two cases of simulated mobile bed processes must be considered, differing in the manner in which the recycling pump (for liquids and supercritical fluids which are dense enough to pump) or a recycling compressor (for gases and non pumpable supercritical fluids) which circulate the liquid in the circuit of n fixed beds:

A) In a first case, each fixed bed is contained in an individual column and the recycling pump can be displaced from one column junction to the next at the same rate as that of the fluid injection and extraction points. In this case (as described in U.S. Pat. No. 5,093,004 and WO 93/22022), the volume of the line bringing the fluid from the outlet to one column to the recycling pump inlet, the volume of the pump itself and the volume of the line bringing the fluid from the pump outlet to the inlet to the following column (the total of these three terms constituting the volume of the recycling circuit) are, as in the case of real counter-current separation, of no consequence since these volumes are designed to be occupied exclusively by pure eluent.

B) In a second case, each fixed bed or chromatographic column section is connected to the next by a line which can only go to the next bed (in particular when several fixed beds are located in the same column) except for the $n^{th}$ whose outlet is connected to the inlet of the recycling pump P, the outlet of said pump P being connected to the first of the fixed beds (see FIG. 2). Naturally, the numbering of these column sections is purely arbitrary; by convention, the first is considered to be the section with its inlet connected to the recycling pump outlet and the last or $n^{th}$ has its outlet connected to the inlet of the pump. In this case, the recycling pump will pass all of the concentration profiles. The dead volume of the pump creates an anisotropy in the volume of the $n^{th}$ fixed bed compared with the others and causes a perturbation in the compositions of the extract and raffinate, reducing the purity and the yield. In general, in order to minimise the total dead volume in the circuit, the junction lines between the different columns are all designed to have the same volume, this volume being reduced to the minimum volume possible. When the fluid in the system is a gas recycled by a compressor, the observed perturbation is much lower than that obtained in the case of a liquid or a pumpable supercritical fluid. For gases at low pressure, the perturbation is negligible.

In order to operate the process, there must be a different flow rate in each zone and thus the recycling pump (or the compressor) adopts at least four different flow rates during the course of a cycle. Changes in the loading of the recycling pump (regulated by flow rate) take place each time that one of the inlet or outlet streams of the circuit passes from a position immediately anterior to a position immediately posterior to the recycling pump. Thus, when the eluent S injection point passes from the anterior connection to the posterior connection to the recycling pump, the load on the latter becomes D4 (the flow rate of zone 4). Then when the raffinate extraction point RB passes from the anterior connection to the posterior connection to the recycling pump, the load on the latter becomes D3 (the flow rate in zone 3), where D3=D4+R, where R represents the raffinate flow rate. When the feed A+B injection point passes from the anterior connection to the posterior connection to the recycling pump, the load on the latter becomes D2 (the flow rate in zone 2), where D2=D4+R−C, where C represents the flow rate of the feed. Finally, when the extract extraction point EA passes from the anterior connection to the posterior connection to the recycling pump, the load on the latter becomes D1 (the flow rate in zone 1), where D1=D4+S where S represents the eluent flow rate.

For simplicity, the unit can be represented as an ensemble of segments which desirably should all be of the same length L (these segments symbolise the column sections). However, we are obliged to add a length l (l symbolises the dead volume of the recycling circuit) to one of the segments. When the unit is operating, a point displaces along these segments with a constant speed u. The point requires a time θ to traverse the ensemble of the n segments and the operation is optimised when the segment junctions are crossed in a synchronised manner at times which are multiples of θ/n. In the ideal case (n segments of length L), T=θ/n=L/u; in a real case, T and θ are fixed by ignoring l. The total length to be traversed is no longer n.L but n.L+l; during each period T, the point traverses a distance L+l/n, but it should traverse a distance L for the first n−1 periods and L+l for the last period. Passage of the point across the segment junctions is no longer synchronised to multiples of T but is only synchronised for each multiple of θ. L, l and u respectively can be obtained by dividing the volume V of each of the sections, the dead volume v of the recycling circuit and the flow rate $D_i$ in the sections by the cross section of the sections.

Figure 4:
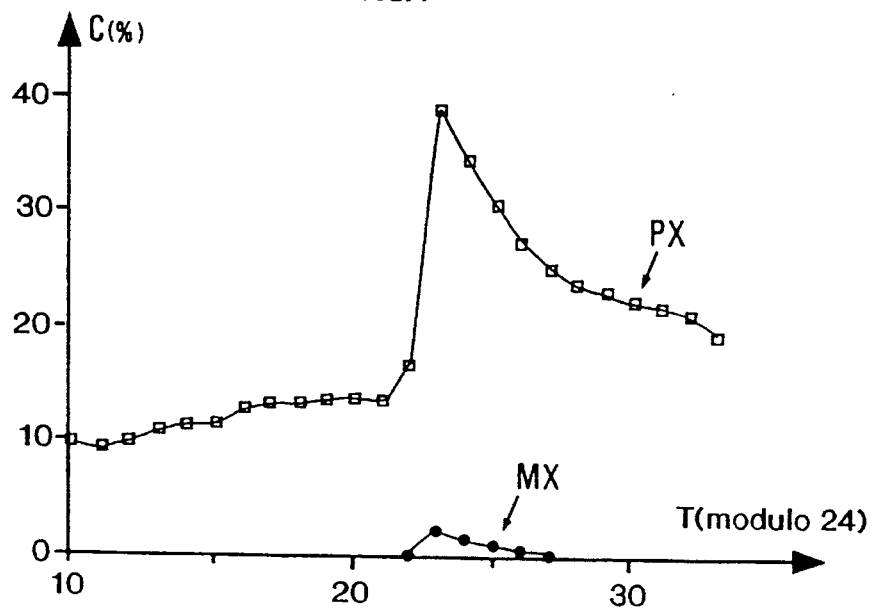
FIG. 4 shows variations in the composition C (weight %) of samples of extract taken at the same instant in each period T of the cycle as a function of the period number in the cycle (modulo 24)

FIG. 4 shows an example of the perturbation caused by the volume of the recycling circuit on the instantaneous composition of the extract taken at the same moment in each period, period by period, in a simulated mobile bed with 4 zones and 24 sections. If several successive cycles are observed, the perturbation is seen to have a periodicity of 24 periods, i.e., 1ū cycle (Proceedings of the 9th International Symposium on Preparative Chromatography, Nancy, April 1992, Balannec-Hotier).

A first object of the invention, when the mixture is a liquid or a pumpable supercritical fluid, is to overcome the perturbation in the composition of the extract caused by the dead volume in the recycling pump located between the $n^{th}$ and the first bed.

A second object of the invention, when the mixture is a pressurized gas or a less dense supercritical fluid, is to overcome the perturbation in the composition of the extract caused by the dead volume in the recycling pump located between the $n^{th}$ and the first bed.

More generally, the object of the invention is to overcome the perturbations in the extract composition caused by the dead volumes of the various apparatus located between two consecutive beds in the circuit.

A further object of the invention is to overcome the perturbations in the raffinate composition caused by the dead volumes of the various apparatus located between two consecutive beds in the circuit, when of course it is desirable that the raffinate composition rather than the extract composition is as constant as possible.

More precisely, the invention concerns a process for the simulated mobile bed separation of a feed containing at least two constituents in the presence of at least one eluent into at least two fractions, the simulated mobile bed comprising n, advantageously 4 to 24, chromatographic columns or column sections mounted in series and in a closed circuit, in which a liquid, supercritical or gaseous mixture circulates under pressure, the circuit having at least one feed injection stream, at least one eluent injection stream, at least one extract extraction stream and at least one raffinate extraction stream, the desired constituent being either mainly in the extract or mainly in the raffinate, at least four zones being determined in said columns, each zone being separated from the following zone by an injection or extraction stream, the injection and extraction streams being simultaneously shifted at substantially constant time intervals, the closed circuit comprising a recycling pump for said mixture, which is flow rate regulated and located between two successive columns or column sections, optionally at least one measuring or sampling means and optionally at least one recycling pump which is pressure regulated, said measuring or sampling means and/or pressure regulated recycling pump each being located between two consecutive columns or column sections, said pumps and/or measuring or sampling means each having a dead volume in the recycling circuit which causes perturbations in the extract and in the raffinate composition, the process being characterised in that, each time that an injection or extraction stream passes from an immediately anterior position to an immediately posterior position to each of the dead volumes in the circuit, the flow rate of the flow rate regulated recycling pump is increased by an appropriate value for the time during which the extract or raffinate remains in the immediately posterior position to the dead volume, and then when the stream passes from the immediately posterior position to the dead volume to the following position, the flow rate of the flow rate regulated recycling pump is reduced so that said flow rate regains the value which would have been applied if the dead volume had been ignored.

The term "recycling pump" must be taken in its generic sense as a circulation means, i.e., a pump in the case of a pumpable liquid or supercritcal mixture, and a compressor in the case of a pressurized gaseous mixture or a less dense supercritical mixture.

For convenience, the flow rate regulated recycling pump is considered, for example, to be arbitrarily located between columns n and 1 and the constituent required is mainly in the extract. Using the schematisation described above, the problem thus consists of reestablishing a situation such that the point arrives at the end of each segment at the end of each of the periods in the cycle with a total cycle time of θ. We propose to achieve this by increasing the speed of the point from u to u+Δu when the point is traversing the $n^{th}$ segment with length L+l so that L/u=(L+l)/(u+Δu)=T. This segment is thus traversed in a time T in the simplest case where a single dead volume (that of the recycling pump) is present in the circuit. This solution is readily generalisable to several segments with a length other than L.

In a first variation where only the recycling pump located between columns n and 1 has a dead volume, this correction is achieved practically by adopting a higher flow rate at the moment when the extract extraction point passes from the outlet to section n-1 to the outlet to section n. The value of the flow rate in zone 1, instead of being $D_1$ in the absence of a correction, will be $$D'_1 = D_1 \left[ 1 + \frac{v}{\epsilon V} \right]$$

where $\epsilon$ is a coefficient between $\epsilon b$ and 1, $\epsilon b$ representing the total, expressed, as a volume fraction of a column, of the intergrain (bed) and grain porosities, v is the dead volume in the recycling circuit, V is the volume of a void section of column and the connection to the following section. $\epsilon$ naturally depends on the adsorption isotherm competing with the different constituents in the presence of the fixed phase, in particular its adsorption capacity. Its value also changes depending on whether the perturbation in the raffinate or extract is corrected. This correction corrects the perturbation in the extract but the same perturbation occurs when the raffinate passes the volume of the recycling circuit; an identical correction is, however, not desirable since it causes an increase in the flow rate in the whole circuit and thus a change in the flow rate in the section from which the extract is being removed.

In a second variation, the fluid mixture can be a pressurized gas or a less dense supercritical fluid. In this case, it is driven by a compressor which is flow rate regulated and optionally by at least one pressure regulated compressor. The correcting term can then be attenuated by multiplying it by the ratio of the densities of the fluid phase df and the adsorbed phase da.

More generally, if as is often the case a flow rate regulated recycling pump and one or more pressure controlled recycling pumps are used, the problem of two or more anisotropies is resolved in the same manner, by increasing the recycle flow rate $D_i$ each time the extract extraction point (when the desired constituent is mainly in the extract) passes from a connection to the recycling circuit situated immediately downstream of the dead volume or anisotropy.

While the main cause of introduction of dead volumes in a simulated mobile bed chromatographic apparatus is the recycling pump(s) or compressor(s), the introduction of other apparatus between two particular columns will produce the same effects: some measuring or sampling apparatus can be mentioned such as a flow meter, a spectrometer cell to measure the composition on-line, a by-pass or a sampling circuit. Each particular anisotropy, thus each dead volume caused by the introduction of a particular apparatus, can be compensated for by increasing the flow rate in the recycling circuit when the extract extraction point (if this is the case) passes from the upstream connection to the connection downstream of the anisotropy. This corrected flow rate is increased in accordance with the relationship $$D'_i = D_i \left[ 1 + \frac{v}{\epsilon V} \right]$$

where $D'_i$ is the corrected flow rate in zone i and $D_i$ is the flow rate of the pump in zone i when the dead volume is ignored.

As indicated above, the flow rates are then brought to the values which would have been applied if the dead volumes had been ignored. In the case of a pressurized gaseous mixture, or a less dense supercritical fluid, the correcting term is multiplied by the ratio df over da as indicated above.

FIGS. 2A, 2B and 2C represent the operation of a simulated counter-current apparatus where the liquid and the commutation displacement displace in the same sense (clockwise). The apparatus comprises 24 columns containing adsorbent and connected together, column 24 (n) and column 1 being connected via a fixed recycling pump P. Zone 1 is delimited by the eluent injection point S and extract extraction point EA, zone 2 by the extract extraction point and the feed injection point A+B, zone 3 by the feed injection point A+B and the raffinate extraction point RB, and zone 4 by the raffinate extraction point and the eluent injection point. At the end of each period, the injection and extraction streams are shifted.

FIG. 3 shows a succession of column sections n, extract extraction EA, raffinate extraction RB, feed injection A+B and eluent injection S between two sections. Further, this figure shows the particular arrangement wherein the recycling pump and/or measuring means are located immediately upstream of the extract extraction stream EA or raffinate extraction stream RB, these latter being located upstream of bed 1. In this case, when the extract extraction stream passes from the outlet to the $n-^{th}$ to that of the $n^{th}$ bed, the flow rate in the recycling circuit must be increased.

In a variation which is not illustrated, the extraction points from the $n^{th}$ bed and the injection points into the first bed are between the $n^{th}$ bed and the recycling pump; in this case, when the extract connection passes from the $n^{th}$ bed to the first bed the flow rate in the recycling circuit must be increased.

The following example illustrates the invention without limiting its scope; FIG. 5 shows the composition of the extract period by period without any compensation. FIG. 6 shows the same diagram when compensation is effected by increasing the recycling flow rate when the extract extraction point passes from the penultimate section to the last section.

EXAMPLE 1A (comparative)

In accordance with the prior art, a feed with the following composition was separated: ethylbenzene (EB) 12.07%, para-xylene (PX) 22.95%, ortho-plus meta-xylene (OX+MX) 64.98%. The unit consisted of 24 columns of 1 m in length and 1 cm diameter, operated as a simulated mobile bed in counter-current mode. The lines and pump intercalated between columns 24 and 1 created a dead volume of 17.25 cm³. The respective flow rates of the feed, the eluent constituted by substantially pure toluene, the extract and the raffinate were 1.42 cm³/min, 2.45 cm³/min, 2.05 cm³/min and 1.82 cm³/min. The adsorbent was a barium and potassium exchanged Y zeolite such as SPX 2000 from CECA (France). The columns were divided as follows: 5 in zone 4, 4 in zone 3, 7 in zone 2, 8 in zone 1. The recycling pump flow rates were as follows: 5 times in zone 4, 9.1 cm³/min, 4 times in zone 3, 10.92 cm³/min, 7 times in zone 2, 9.5 cm³/min and 8 times in zone 1, 11.55 cm³/min. The shift period was five minutes. During the first period of the cycle, the eluent was injected into the inlet to column 1, the extract was removed from the outlet to column 8, the feed was injected into the inlet to column 16 and the raffinate was removed from the outlet to column 19. The average purity obtained for the para-xylene in the extract was 90.70% and the yield was 99.90%. FIG. 5 shows that the compositions of the extract measured period by period were very variable.

EXAMPLE 1B

In accordance with the invention, with all the parameters remaining the same, the following flow rates were imposed on the recycling pump: 5 times in zone 4, 9.1 cm³/min, 4 times in zone 3, 10.92 cm³/min, 7 times in zone 2, 9.5 cm³/min and 1 time in zone 1, corresponding to the correction, of 15 cm³/min, 7 times in zone 1, 11.55 cm³/min. The average purity obtained was 95.54% and the yield was 98.7% for the para-xylene in the extract FIG. 6 shows that the compositions of extracts taken period by period were extremely close: the maximum difference had been divided by 4. It can thus be seenü that the correction was applied only during the 17$^{th}$ period of the cycle, when the extract was removed from the outlet to column 24. During this particular period, it should be noted that the flow rate in the four zones was changed: the flow rate in zone 1 was $D'_1=15$ cm³/min, while during the other 23 periods the flow rate $D_1$ was 11.55 cm³/min, the flow rate in zone 2 was $D'_2=12.95$ cm³/min, while during the other 23 periods the flow rate $D_2$ was 9.5 cm³/min, the flow rate in zone 3 was $D'_3=14.37$ cm³/min, while during the other 23 periods the flow rate $D_3$ was 10.92 cm³/min, and the flow rate in zone 4 was $D'_4=12.55$ cm³/min while during the other 23 periods the flow rate $D_4$ was 9.1 cm³/min. The flow rate $D'_1=15$ cm³/min was between $D_1[1+v/V]$ (where $D_1=11.55$ cm³/min, $v=17.25$ cm³, $V=78.5$ cm³), i.e., 14.09 cm³/min, and $$D_1\left[1+\frac{v}{\epsilon bV}\right]$$

(where $\epsilon b=0.58$, i.e., 0.33 for the porosity of the bed and 0.25 for the grain porosity), i.e., 15.92 cm³/min.

EXAMPLE 1C

In addition to the recyclinq pump between the first and 24$^{th}$ bed, a spectrophotometer with a dead volume of 8 cm³ was intercalated between the 12$^{th}$ and 13$^{th}$ beds. The 8 cm³ were considered to be integral with column 12 as for the pump in FIG. 3. The flow rates imposed on the recycling pump were as follows: 4 times in zone 4, 9.1 cm³/min, 1 time in zone 4, 10.35 cm³/min corresponding to the correction for the measurement means described, 4 times in zone 3, 10.92 cm³/min, 7 times in zone 2, 9.5 cm³/min and 1 time in zone 1, corresponding to the correction for the recycling pump, of 15 cm³/min, and 7 times in zone 1, 11.55 cm³/min. It should be noted that in addition to the first correction described above, a second correction was imposed in the 5$^{th}$ period only, when the extract was removed from the outlet to column 12. As before, the flow rates in the four zones were modified, giving $D'_1=12.80$ cm³/min, $D'_2=10.75$ cm³/min, $D'_3=12.17$ cm³/min, and $D'_4=10.35$ cm³/min. The flow rate $D'_4=15$ cm³/min was between $D_4[1+v/V]$, i.e., 10.03 cm³/min, and $$D_4\left[1+\frac{v}{\epsilon bV}\right]$$

i.e., 10.7 cm³/min.

We claim:

1. A process for the simulated mobile bed separation of a feed containing at least two constituents in the presence of at least one eluent into at least two fractions, comprising n, advantageously 4 to 24 chromatographic columns or column sections mounted in series and in a closed circuit, in which a liquid, supercritical or gaseous mixture circulates under pressure, the circuit having at least one feed injection stream, at least one eluent injection stream, at least one extract extraction stream (EA) and at least one raffinate extraction stream (RB), the desired constituent being either mainly in the extract or mainly in the raffinate, at least four zones each being determined in said columns, each zone being separated from the following zone by an injection or extraction stream, the injection and extraction streams being simultaneously shifted at substantially constant time intervals, the closed circuit comprising a recycling pump for said mixture, which is flow rate regulated and located between two successive columns or column sections, optionally at least one measuring or sampling means and optionally at least one recycling pump which is pressure regulated, said measuring or sampling means and/or the pressure regulated recycling pump (P) each being located between two consecutive columns or column sections, said pumps and/or measuring or sampling means each having a dead volume in the recycling circuit which causes perturbations in the extract and in the raffinate composition, the process comprising, each time an extract extraction stream (EA) or that of the raffinate (RB) passes from an immediately anterior position to an immediately posterior position to each of the dead volumes in the circuit, the flow rate of the flow rate regulated recycling pump is increased by an appropriate value for the time during which the extract or the raffinate remains in the immediately posterior position to the dead volume, and then when the stream passes from the immediately posterior position to the dead volume to the following position, the flow rate of the flow rate regulated recycling pump is reduced so that said flow rate regains the value which would have been applied if the dead volume had not occurred.

2. A process according to claim 1, in which said mixture is liquid or supercritical and in which the flow rate of the recycling pump is increased in accordance with the relationship $$D'_i=D_i\left[1+\frac{v}{\epsilon V}\right]$$

where $D'_i$ is the corrected flow rate in zone i, $D_i$ is the flow rate which would have been applied if the dead volume(s) were not taken into account, v is the dead volume(s) whose effects are to be corrected, V is the individual void volume of a section and its connection to the following section, $\epsilon$ is a coefficient between $\epsilon b$ and 1, where $\epsilon b$ is expressed as the fractional volume of a column or column section and represents the total intergrain and grain porosities in said column or column section.

3. A process according to claim 2, in which said mixture is a pressurized gas or a less dense supercritical fluid, and one or more recycling compressor(s) are used in place of the recycling pump(s), and the flow rate of the compressor(s) is increased in accordance with the relationship $$D'_i = D_i \left[ 1 + \frac{d_f v}{d_a \epsilon V} \right]$$

where $D'_i$, $D_i$, v, V and $\epsilon$ are the parameters of claim 2 and where df is the density of the fluid phase and da is the density of the adsorbed phase.

4. A process according to claim 1, in which the recycling pump(s) or compressor(s) and/or the measuring means are located immediately downstream of the column preceding them and immediately upstream of the extract or raffinate extraction stream upstream of the column following them.

5. A process according to claim 1, in which the pump(s) or compressor(s) and/or the measuring means are located immediately downstream of the extract or raffinate extraction stream and immediately upstream of the column following them.

6. A process according to claim 1, in which the simulated mobile bed is in counter-current mode.

7. A process according to claim 1, in which the simulated mobile bed is in co-current mode.

8. A process according claim 1, in which the feed comprises a mixture of aromatic hydrocarbons containing 8 carbon atoms.

* * * * *